US012011628B2

(12) United States Patent
Ryczek

(10) Patent No.: US 12,011,628 B2
(45) Date of Patent: Jun. 18, 2024

(54) NOZZLE AIMING DEVICE

(71) Applicant: Tyco Fire Products LP, Lansdale, PA (US)

(72) Inventor: Chad L. Ryczek, Oconto Falls, WI (US)

(73) Assignee: Tyco Fire Products LP, Cranston, RI (US)

( * ) Notice: Subject to any disclaimer, the term of this patent is extended or adjusted under 35 U.S.C. 154(b) by 341 days.

(21) Appl. No.: 17/616,071

(22) PCT Filed: Jun. 3, 2020

(86) PCT No.: PCT/IB2020/055242

§ 371 (c)(1),
(2) Date: Dec. 2, 2021

(87) PCT Pub. No.: WO2020/245744

PCT Pub. Date: Dec. 10, 2020

(65) Prior Publication Data

US 2022/0296945 A1 Sep. 22, 2022

Related U.S. Application Data

(60) Provisional application No. 62/857,566, filed on Jun. 5, 2019.

(51) Int. Cl.

| | |
|---|---|
| ***A62C 35/68*** | (2006.01) |
| ***F21V 14/06*** | (2006.01) |
| ***F21V 21/096*** | (2006.01) |
| ***F21V 33/00*** | (2006.01) |

(52) U.S. Cl.
CPC .............. *A62C 35/68* (2013.01); *F21V 14/06* (2013.01); *F21V 21/096* (2013.01); *F21V 33/0064* (2013.01)

(58) Field of Classification Search
CPC ....... A62C 35/68; F21V 14/06; F21V 21/096; F21V 33/0064
See application file for complete search history.

(56) References Cited

U.S. PATENT DOCUMENTS

| | | | |
|---|---|---|---|
| 5,683,168 A | 11/1997 | Teig et al. | |
| 5,795,053 A * | 8/1998 | Pierce | F21V 33/0064 362/253 |
| 9,539,454 B1 | 1/2017 | Griggs et al. | |
| 2003/0141376 A1 | 5/2003 | Akitaka | |

(Continued)

FOREIGN PATENT DOCUMENTS

| | | |
|---|---|---|
| CN | 103994337 A | 8/2014 |
| KR | 101003795 B1 | 12/2010 |

OTHER PUBLICATIONS

International Search Report and Written Opinion on International Application No. PCT/IB2020/055242, mail date Sep. 2, 2020, 11 pages.

*Primary Examiner* — Thomas M Sember
(74) *Attorney, Agent, or Firm* — Foley & Lardner LLP

(57) ABSTRACT

An aiming assembly including a housing and a light source. The housing is configured to be coupled to a nozzle and includes at least one mounting feature configured to retain the housing in a desired position relative to the nozzle. The light source provided at least partially within the housing and configured to selectively generate a conical light beam, and generate a light image.

19 Claims, 6 Drawing Sheets

(56) References Cited

U.S. PATENT DOCUMENTS

| | | | |
|---|---|---|---|
| 2003/0178503 | A1 | 9/2003 | Horan et al. |
| 2003/0226907 | A1 | 12/2003 | Geser et al. |
| 2010/0012751 | A1 * | 1/2010 | Warren .................. B05B 15/00 239/289 |
| 2010/0096472 | A1 | 4/2010 | Klein et al. |
| 2016/0375456 | A1 | 12/2016 | Rath et al. |
| 2018/0073233 | A1 | 3/2018 | Liu |

* cited by examiner

NOZZLE AIMING DEVICE

CROSS-REFERENCE TO RELATED PATENT APPLICATIONS

This application claims the benefit of and priority to U.S. Provisional Application No. 62/857,566, filed Jun. 5, 2019, which is incorporated herein by reference in its entirety.

BACKGROUND

Fire suppression systems may be used to protect an area and objects within the area from fire. Fire suppression systems may protect areas or objects such as, kitchen equipment, engines, hazard areas in buildings, etc. Fire suppression systems may utilize nozzles to direct the flow of a fire suppressant agent onto the protected area or object. The nozzle is aimed to maximize an amount of the fire suppressant agent that coats the protected area or object.

SUMMARY

One embodiment relates to an aiming device. The aiming assembly includes a housing and a light source. The housing is configured to be coupled to a nozzle and includes at least one mounting feature configured to retain the housing in a desired position relative to the nozzle. The light source provided at least partially within the housing and configured to selectively generate a conical light beam, and generate a light image.

Another embodiment relates to a nozzle assembly. The nozzle assembly includes a nozzle, and an aiming assembly coupled to the nozzle. The aiming assembly includes a housing defining an aperture to accept the nozzle and a light source positioned within the housing. The light source generates a light pattern configured to align with at least a portion of an expected spray pattern of the nozzle.

Another embodiment relates to a method for aiming a nozzle. The method includes coupling an aiming assembly to the nozzle. The method also includes projecting a light pattern that provides an indication of an expected spray pattern of the nozzle and aligning the aiming assembly to a spray direction of the nozzle. The method further includes redirecting the nozzle and the aiming device to a desired direction.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
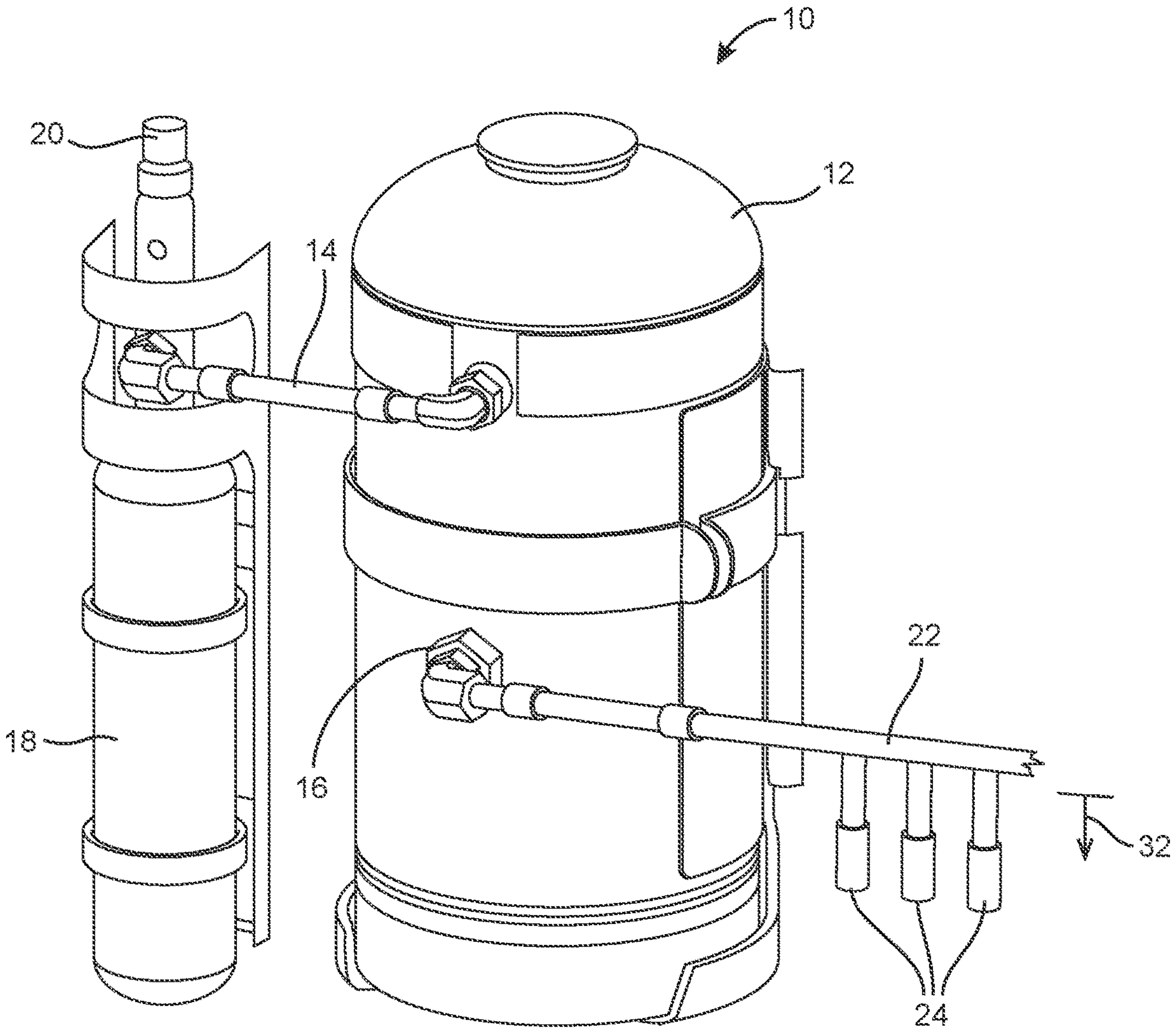
FIG. 1 is a schematic of a fire suppression system, according to an exemplary embodiment.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Hazard areas or objects (e.g., kitchens, vehicles, buildings, etc.) which are in proximity to combustible fluids (e.g., grease, cooking oil, fuel, hydraulic oil, engine oil, etc.) or are flammable (e.g., wood studs in a building, etc.) may be prone to fires. The fires may be caused by an introduction of a heated element (e.g., from sparks, engine components, open flames, etc.) to the combustible fluid or the flammable object, which then ignites the combustible fluid or flammable object, creating a fire.

Fire suppression systems are generally configured to actuate automatically or manually in response to the fire and discharge a fire suppressant (e.g., firefighting agent, fire suppressant agent, etc.) onto the hazard area or object. The discharge of the fire suppressant occurs through one or more nozzles. The nozzles are generally fixed in a single position (i.e., do not move or oscillate when the fire suppression system activates), and are directed at a specific area within the hazard area or directed at the hazard object. The nozzles generally generate a conical or pyramidal spray pattern such that as the fire suppressant agent from the nozzle travels towards the hazard area or object, the fire suppressant agent spray pattern widens (i.e., the further from the nozzle the fire suppressant agent travels, the larger radius the fire suppressant agent covers) and generates a spray area (i.e., the area of the hazard area or object covered by the fire suppressant agent). The spray area may not be the same spray area for objects of different depth (i.e., the further from the nozzle the area is, the larger the spray area may become).

An aiming device can be utilized to facilitate aiming the nozzle. The aiming device includes a light source, which facilitates prediction of the spray area of the fire suppressant agent change at differential depths. The light source generates a light beam and a light projection on the hazard area or object, which may be coincident with the spray area. The light source may be used to portray to a user the spray area change at differential depths. The light source may then facilitate prediction of the spray area when the fire suppressant agent is discharged.

Referring generally to the figures, an aiming device for a nozzle in a fire suppression system is shown according to an exemplary embodiment. The nozzle has a spray pattern which a fire suppressant agent of the fire suppression system is discharged at. The aiming device is configured to removably couple to the nozzle. The aiming device includes a housing, a light source, and one or more light displacement devices (e.g., filters, reflectors, screens, etc.). Powering the light source generates a light beam, preferably conical in shape. The light beam generates a light projection forming a ring. The light beam may include a central dot centered on the hazard area or object. When the aiming device is removably coupled to the nozzle, the light projection and the spray area of the fire suppressant agent discharged from the nozzle are coincident. The light projection facilitates aiming the nozzle such that the fire suppressant agent spray area is maximized over the hazard area or object.

Fire Suppression System

Referring to FIG. 1, a fire suppression system 10 is shown according to an exemplary embodiment. In one embodiment, the fire suppression system 10 is a chemical fire suppression system. The fire suppression system 10 is configured to dispense or distribute a fire suppressant agent onto and/or nearby a fire, extinguishing the fire and preventing the fire from spreading. The fire suppression system 10 can be used alone or in combination with other types of fire suppression systems (e.g., a building sprinkler system, a handheld fire extinguisher, etc.). In some embodiments, multiple fire suppression systems 10 are used in combination with one another to cover a larger area (e.g., each in different rooms of a building).

The fire suppression system 10 can be used in a variety of different applications. Different applications can require different types of fire suppressant agent and different levels of mobility. The fire suppression system 10 is usable with a variety of different fire suppressant agents, such as powders, liquids, foams, or other fluid or flowable materials. The fire suppression system 10 can be used in a variety of stationary applications. By way of example, the fire suppression system 10 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 10 can be used in a variety of mobile applications. By way of example, the fire suppression system 10 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 1, the fire suppression system 10 includes one or more fire suppressant tanks 12 (e.g., vessels, containers, vats, drums, tanks, canisters, cartridges, cans, etc.). The fire suppressant tank 12 is filled (e.g., partially, completely, etc.) with fire suppressant agent. In some embodiments, the fire suppressant agent is normally not pressurized (e.g., is near atmospheric pressure). The fire suppressant tank 12 includes an exchange section, shown as hose 14 and an outlet section (e.g., an aperture, a valve, etc.), shown as outlet valve 16. The hose 14 permits the flow of expellant gas into the fire suppressant tank 12 and the outlet valve 16 permits the flow of fire suppressant agent out of the fire suppressant tank 12 so that the fire suppressant agent can be supplied to a fire.

The fire suppression system 10 further includes a cartridge 18 (e.g., a vessel, container, vat, drum, tank, canister, cartridge, or can, etc.). The cartridge 18 is configured to contain a volume of pressurized expellant gas. The expellant gas can be an inert gas. In some embodiments, the expellant gas is air, carbon dioxide, or nitrogen. The cartridge 18 can be rechargeable or disposable after use. The cartridge 18 may be positioned remote of the fire suppressant tank 12 or may be formed as a single component with the fire suppressant tank 12.

The fire suppression system 10 further includes a valve, puncture device, or activator assembly, shown as actuator 20. The actuator 20 is configured to selectively fluidly couple the cartridge 18 to the fire suppressant tank 12 to facilitate activation of the fire suppression system 10. Decoupling the cartridge 18 from the actuator 20 may facilitate removal and replacement of the cartridge 18 when the cartridge 18 is depleted. The actuator 20 may include a pin, a needle, or another form of puncturing to create a flow path from the cartridge 18 to the fire suppressant tank 12.

Once the actuator 20 is activated and the cartridge 18 is fluidly coupled to fire suppressant tank 12 via the hose 14, the expellant gas from the cartridge 18 flows freely through the hose 14 and into the fire suppressant tank 12. The expellant gas enters the fire suppressant tank 12 and forces fire suppressant agent from the fire suppressant tank 12 through the outlet valve 16 and into a conduit or hose, shown as pipe 22. In one embodiment, the hose 14 directs the expellant gas from the cartridge 18 to the fire suppressant tank 12 (e.g., to a top portion of the fire suppressant tank 12). The pressure of the expellant gas within the fire suppressant tank 12 forces the fire suppressant agent to exit through the outlet valve 16. In other embodiments, the expellant gas enters a bladder within the fire suppressant tank 12, and the bladder presses against the fire suppressant agent to force the fire suppressant agent out through the outlet valve 16. In some embodiments, the fire suppressant tank 12 includes a burst disk that prevents the fire suppressant agent from flowing out through the hose 14 until the pressure within the fire suppressant tank 12 exceeds a threshold pressure. Once the pressure exceeds the threshold pressure, the burst disk ruptures, permitting the flow of fire suppressant agent out of the fire suppressant tank 12. Alternatively, the fire suppressant tank 12 can include a valve, a puncture device, or another type of opening device or activator assembly that is configured to fluidly couple the fire suppressant tank 12 to the pipe 22 in response to the pressure within the fire suppressant tank 12 exceeding the threshold pressure. Such an opening device can be configured to activate mechanically (e.g., the force of the pressure causes the opening device to activate, etc.), fluidly (e.g., using a pressurized liquid or gas), or electrically (e.g., in response to receiving an electrical signal from a controller). The opening device may include a separate pressure sensor in communication with the fire suppressant tank 12 that causes the opening device to activate.

The pipe 22 is fluidly coupled to one or more outlets or sprayers, shown as nozzles 24. The fire suppressant agent flows into the pipe 22, which directs the fire suppressant agent to the nozzles 24. The nozzles 24 each define one or more apertures, through which the fire suppressant agent exits, defining a spray of fire suppressant agent to cover a desired area. The sprays from the nozzles 24 then suppress or extinguish fire within that area. The apertures of the nozzles 24 can be shaped to define various spray patterns 26 of fire suppressant agent exiting the nozzles 24 (e.g., circular, rectangular, etc.). The nozzles 24 can be aimed such that fire suppressant agent coats specific points of interest (e.g., a specific piece of restaurant equipment, a specific component within an engine compartment of a vehicle, etc.) when released. The nozzles 24 can be configured such that all of the nozzles 24 activate simultaneously or the nozzles 24 can be configured such that only the nozzles 24 near the fire are activated.

Further, the nozzles 24 can be configured to be permanently aimed (e.g., bolted, glued, screwed, etc.) towards a hazard area 50, along a spray direction 32. The spray direction 32 of the nozzle 24 may not be able to be changed by outside forces (e.g., vibration, an object impacting the nozzle 24, etc.). The nozzles 24 can be configured to be selectively aimed (e.g., bearings, nuts and bolts, etc.) at the hazard area 50. The nozzle 24 can be selectively re-aimed at a second hazard area or object if necessary, or may be realigned if the nozzle 24 is misaligned.

Figure 2A:
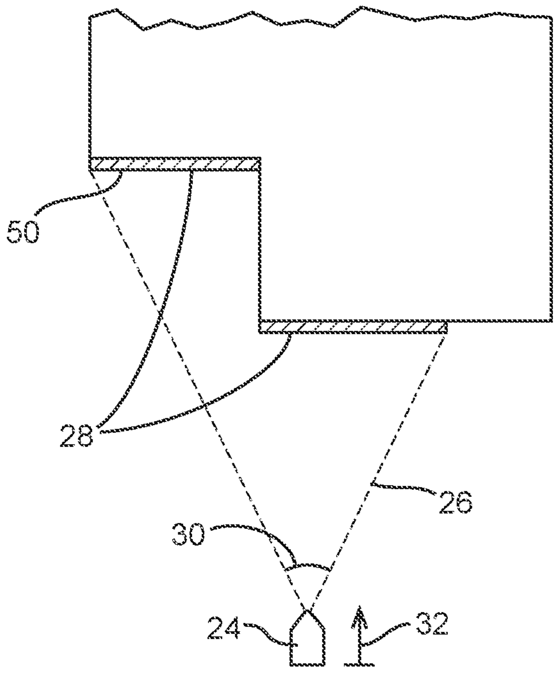
FIG. 2A is an illustration of a spray pattern of a nozzle of the fire suppression system of FIG. 1 on a differential depth surface, according to an exemplary embodiment.
Figure 2B:
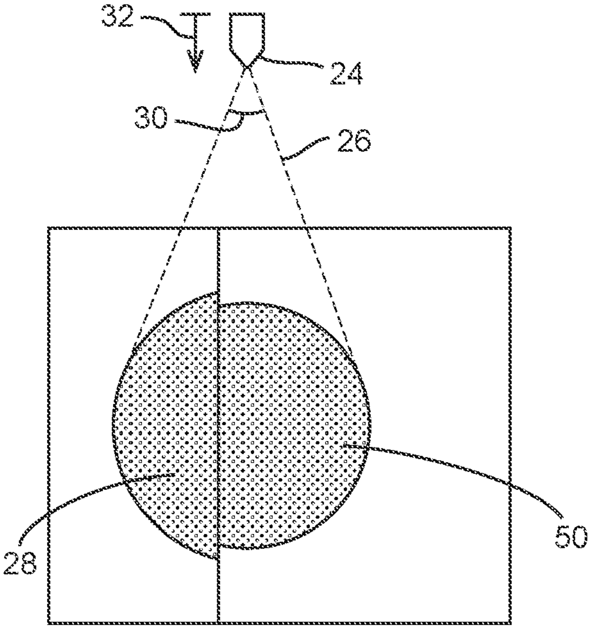
FIG. 2B is a second illustration of the spray pattern of the nozzle of the fire suppression system of FIG. 1 on a differential depth surface of FIG. 2A.
Figure 3A:
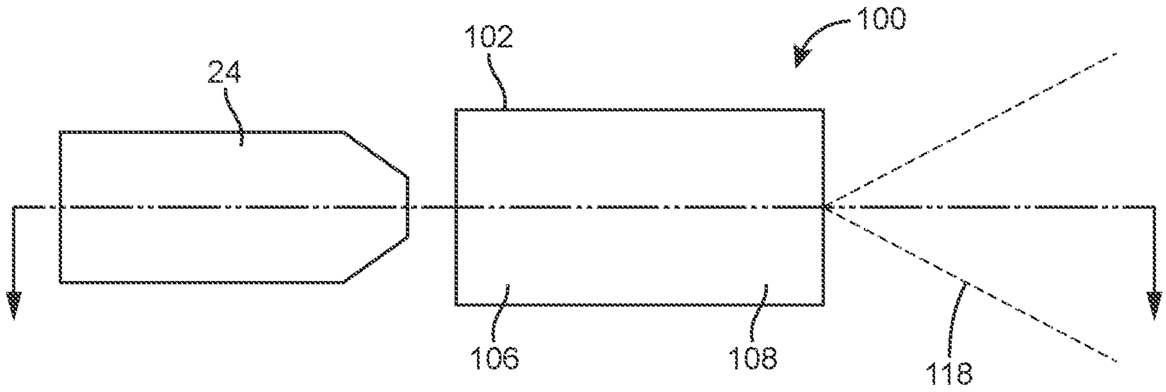
FIG. 3A is an illustration of the nozzle of FIG. 2 and an aiming device, according to an exemplary embodiment.
Figure 3B:
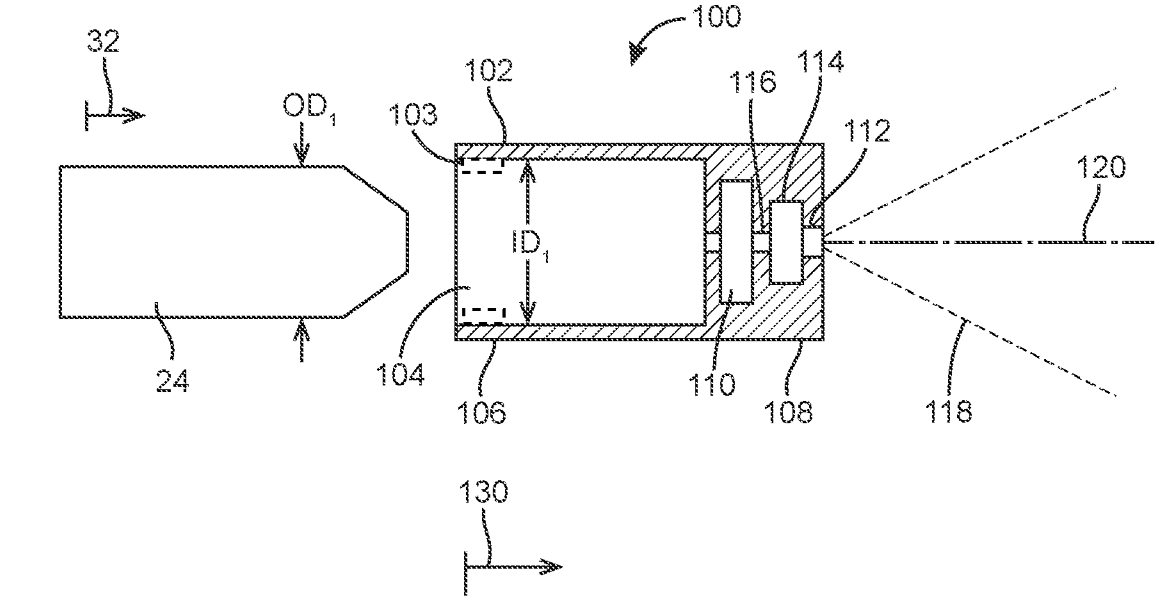
FIG. 3B is a section illustration of the nozzle of FIG. 1 and the aiming device of FIG. 3A.
Figure 4:
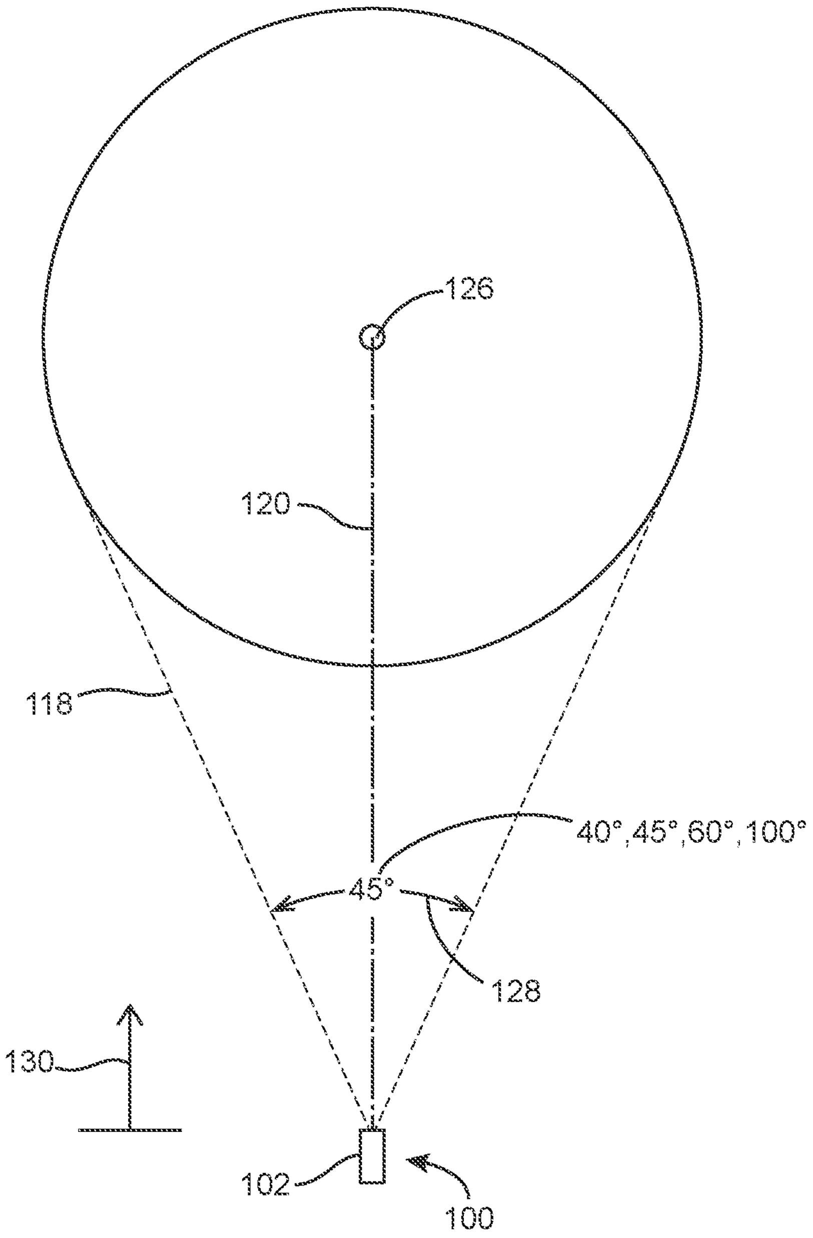
FIG. 4 is an illustration of a range of angles for the aiming device of FIG. 3.

Referring to FIGS. 2A and 2B, the nozzle 24 is defines a discharge shape and direction (e.g., spray direction 32, etc.) of fire suppressant agent, shown as spray pattern 26. A spray area 28 is defined as a surface of the hazard area 50 that fire suppressant agent impacts within the spray pattern 26. The spray area 28 can be a circular shape or the spray area 28 can be an irregular shape. In some embodiments, the nozzle 24 is directed to discharge the fire suppressant agent at a hazard area 50 of different depths. The spray area 28 may have different dimensions on the different depths of the hazard area 50. The spray pattern 26 also has a spray angle 30. The spray area 28 is further defined by the spray angle 30 of the spray pattern 26. The nozzle 24 may have an adjustable spray angle 30 to allow for changes in the size of the spray area 28 after installation of the nozzles 24. The nozzle 24 may also have a rigid spray angle 30, which may not be adjustable.

Aiming Device

Referring to FIGS. 3A-6, an aiming device 100 is shown according to an exemplary embodiment. In some embodiments, the aiming device 100 is configured for use in the fire suppression system 10. In other embodiments, the aiming device 100 is configured for use in other systems (e.g., a watering system, etc.). The aiming device 100 is configured to facilitate aiming of the nozzles 24 of the fire suppression system 10. The aiming device 100 may be removably coupled to the nozzles 24. The aiming device 100 and the nozzle 24 may be a single component.

The aiming device 100 includes a housing 102. The housing 102 defines apertures and cavities to position components of the aiming device 100. The housing 102 may be structured to allow removable and selective coupling of the aiming device 100 to the nozzle 24. The housing 102 may include features, such as mounting features 103 shown in FIG. 3B, that fixedly couple the aiming device 100 to the nozzle 24 while coupled to limit movement of the aiming device 100 relative to the nozzle 24. For example, the housing 102 may include magnets, threads, screws, or other coupling components. The housing 102 may also be structured to permanently couple the aiming device 100 to the nozzle 24. For example, the housing 102 may be defined as a portion of the nozzle 24 or may include features that limit movement of the aiming device 100 relative to the nozzle 24 after coupling.

The housing 102 includes an aperture or recess structured to partially or fully receive the nozzle 24, shown as interface aperture 104. The interface aperture 104 extends partially between a first end region 106 and a second end region 108 of the aiming device 100. The interface aperture 104 defines an inner diameter $ID_1$. In some embodiments, the inner diameter $ID_1$ is substantially equal to an outer diameter $OD_1$ of the nozzle 24. The interface aperture 104 of the housing 102 is structured to receive the nozzle 24 and limit radial movement of the housing 102 relative to the nozzle 24. In other embodiments, the inner diameter $ID_1$ is substantially greater than the outer diameter $OD_1$. A deforming member may be positioned within the interface aperture 104 to limit movement of the aiming device 100 relative to the nozzle 24 during coupling. In yet other embodiments, the interface aperture 104 may be tapered. A tapered interface aperture 104 can facilitate easier coupling the aiming device 100 to the nozzle 24. The interface aperture 104 may have a larger diameter at the first end region 106 and a smaller diameter at the second end region 108.

The housing 102 may include a notch or a groove. The notch or the groove is structured to allow the housing 102 to extend partially around the perimeter of the nozzle 24. In such an embodiment, the housing 102 is defined as a semi-circle. The housing 102 is configured to couple to a portion of the outer diameter $OD_1$ of the nozzle 24 and allow access to the nozzle 24 during coupling of the aiming device 100 and the nozzle 24. The housing 102 can further removably couple to the nozzle 24 via the mounting features 103 (e.g., a magnet, an adhesive, threading, a latch, a fastener, etc.). The mounting features 103 may be positioned within the housing 102, the interface aperture 104, or on another location. The mounting features 103 may be removable from the housing 102. The mounting features 103 may extend around an entire circumference of the housing 102 or may extend around a portion of the housing 102.

In other embodiments, the aiming device 100 and the nozzle 24 can each include threading. The threading of the aiming device 100 and the nozzle 24 facilitate rotatably coupling the aiming device 100 to the nozzle 24. The aiming device 100 can also include pins or screws, which selectively couple the aiming device 100 to the nozzle 24 via pinching. For example the pins or screws are engaged to interface with the nozzle 24 to limit rotation of the aiming device 100 relative to the nozzle 24 and disengaged to allow removal of the aiming device 100 from the nozzle 24.

The nozzle 24 and the aiming device 100 may be formed as a single components. Misalignment of the nozzle 24 may be reduced by eliminating placement error of the aiming device 100. The placement error may be caused by an improper coupling of the nozzle 24 and the aiming device 100. Misalignment can cause the spray area 28 to be off center relative to the hazard area 50 and during activation of the fire suppression system 10, fire suppression agent may not impact a portion of the hazard area 50.

The aiming device 100 includes a light generation device, shown as light source 110 (e.g., LED, laser, etc.). The light source 110 is positioned within the housing 102 closer to the second end region 108 than the interface aperture 104. The housing 102 may include an aperture or a cavity structured to accept the light source 110. The aiming device 100 can include more than one light source 110. The light sources 110 can be the same source (e.g., all LEDs, all lasers, etc.) or the light sources 110 can be different sources (e.g., one LED and one laser, etc.). The housing 102 defines a second aperture to facilitate light generated by the light source 110 to emit from the aiming device 100, shown as light opening 112. The light source 110 can be completely disposed within the light opening 112. The light source 110 can also be partially disposed within the light opening 112 to allow access to the light source 110 post assembly of the aiming device 100. A power source may be positioned within the housing 102. The power source is configured to supply power to the lighting source 110. The power source may also be positioned external of the housing 102 and electrically coupled to the lighting source 110.

One or more light displacement devices 114 (e.g., filters, reflectors, screens, etc.) can be included in the aiming device 100. The light displacement devices 114 are configured to redirect light generated by the light source 110 in a desired direction or into a desired shape. The housing 102 may define a cavity or aperture that accepts the light displacement devices 114. The light displacement devices 114 may be permanently coupled to the housing 102. The light displacement devices 114 may be selectively coupled to the aiming device 100. Selectively coupling of the light displacement devices 114 to the aiming device 100 facilitates replacement of the light displacement devices 114. In some embodiments, the light displacement device 114 is fixedly coupled directly to the light source 110. The light displacement devices 114 may also be a component of the light source 110. In other embodiments, the light displacement device 114 is spaced from the light source 110 via an aperture or a pathway, through which light can travel, shown as light pipe 116. The light displacement devices 114 may be configured to redirect light from the light source 110 in such a way to form a desired shape (e.g., conical, rectangular, pyramidal, etc.) or angle of light (e.g., 10°, 25°, etc.).

The aiming device 100 may generate at least two single beams of light, such that at least two dots are projected on the hazard area 50. One of the beams of light can be a central beam, and a second beam of light can be a perimeter beam. The central beam of light projects a central dot and the perimeter beam projects a perimeter dot. The aiming device 100 can be configured to rotate while coupled to the nozzle 24. During rotation of the aiming device 100, the perimeter dot is configured to portray an outer ring such that the outer ring aligns with the spray pattern 26 of the nozzle 24.

The aiming device 100 may generate a conical light beam 118 (e.g., a conical portion, a conical shape, etc.) and a central light beam 120 (e.g., central image, etc.). The conical light beam 118 and the central light beam 120 are formed by the light displacement device 114. As the light generated by the light source 110 passes through the light displacement device 114 some of the light is blocked, absorbed, reflected, etc. to form a desired shape. The conical light beam 118 and the central light beam 120 formed by the aiming device 100 form a light projection on the hazard area 50. In a preferred embodiment, the light projection can be a light ring 124 and a light central dot 126 projected on the hazard area 50. The conical light beam 118 has an angle at which the light emits from the aiming device 100, shown as emitting angle 128. Changes made to the emitting angle 128 can change the diameter of the light ring 124. The emitting angle 128 can be fixed to a specified angle during manufacturing of the aiming device 100 or prior to coupling of the aiming device 100 to the nozzle 24. The emitting angle 128 may also be changeable while the aiming device 100 is coupled to the nozzle 24. The light central dot 126 is at a geometrical center of the light ring 124 to display the center of the conical light beam 118 for a user.

By way of example, the fire suppressant agent is discharged from a nozzle 24 along a spray pattern 26 at a spray angle 30 to form a spray area 28 on a hazard area 50. An aiming device 100 is coupled to the nozzle 24 and produces a light ring 124. The aiming device 100 is configured to allow changing of an emitting angle 128 to change the diameter of the light ring 124. Changing the diameter of the light ring 124 allows a user to correctly resize and align the light ring 124 to the spray area 28 of the nozzle 24.

In another example, the emitting angle 128 is not changeable. Therefore, the nozzle 24 can accept more than one aiming devices 100. Each aiming device 100 has an emitting angle 128 that defines a specific light ring 124 diameter different than other aiming devices 100. For example, each light displacement device 114 of each aiming device 100 generates the conical light beam 118 at a fixed angle. The fixed angle of a first aiming device 100 may be an angle of 45° and of a second aiming device 100 may be an angle of 60°.

Method for Attachment

Figure 5:
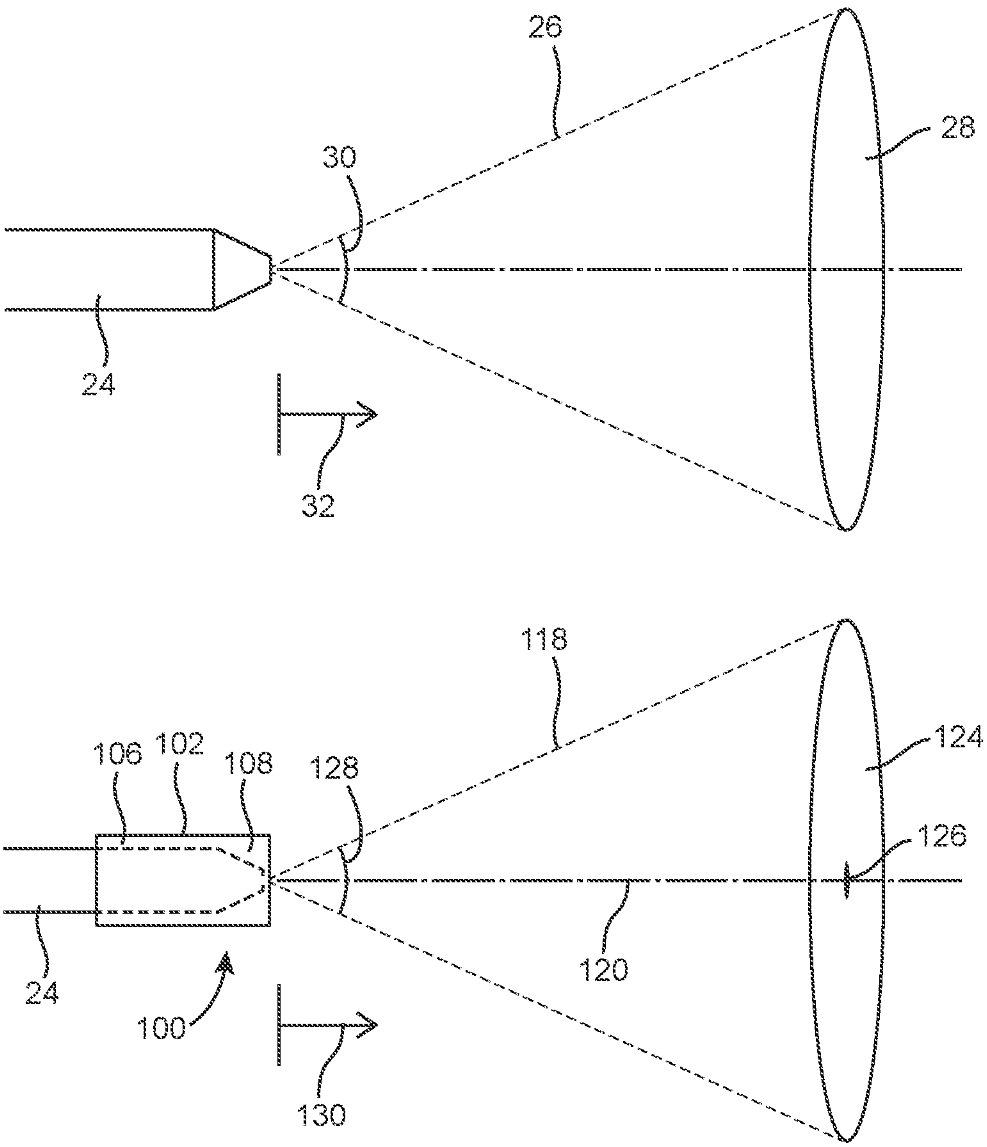
FIG. 5 is an illustration of the aiming device of FIG. 3 coupled to the nozzle of FIG. 2.
Figure 6:
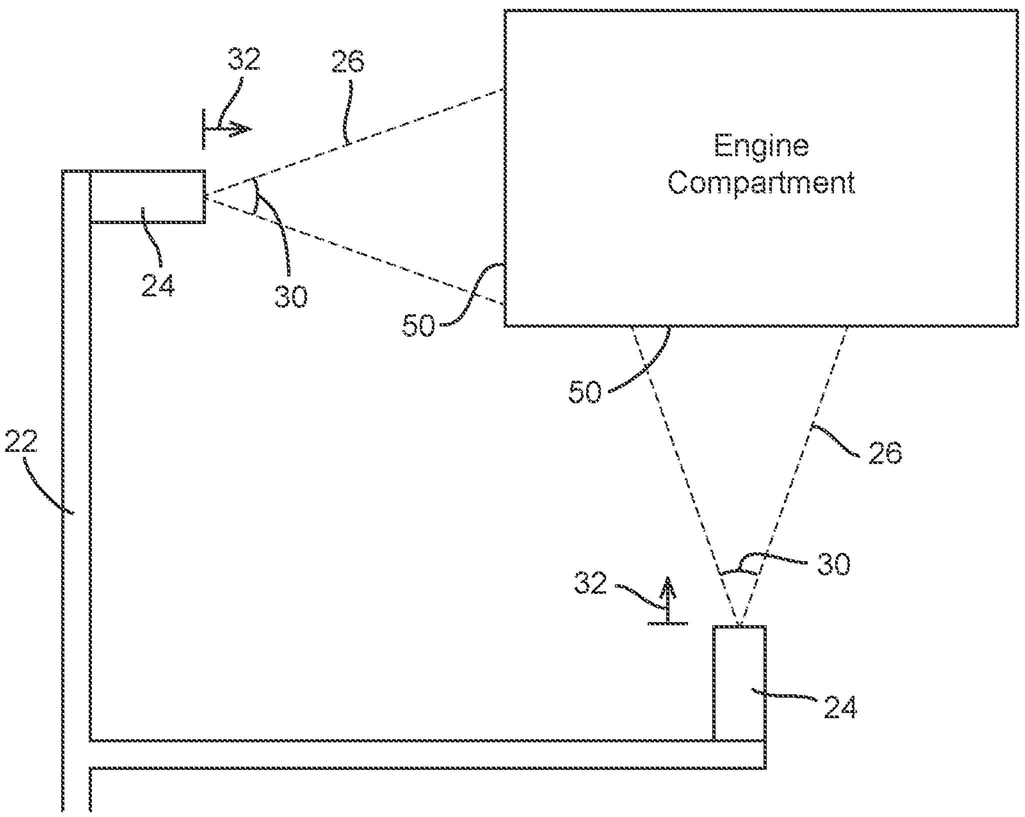
FIG. 6 is an illustration of the nozzle of FIG. 2A in an engine compartment.

Referring to FIGS. 5 and 6, the aiming device 100 and the nozzle 24 being coupled is shown. The aiming device 100 is configured to aim in a direction, shown as light direction 130, substantially similar to a spray direction 32 of the fire suppressant agent discharged from the nozzle 24. The light source 110 is activated (e.g., turned on) once the light direction 130 of the aiming device 100 is substantially similar to the spray direction 32 of the fire suppressant agent discharged from the nozzle 24. The conical light beam 118 is generated in the light direction 130 to align with the spray pattern 26 generated in the spray direction 32. In some embodiments, the conical light beam 118 is coincident with the spray pattern 26 of the nozzle 24. In other embodiments, the light ring 124 is coincident with the spray area 28. The light ring 124 may be coincident with the spray area 28 at varying depths of the hazard area 50. The light ring 124 and the light central dot 126 assist a user during aiming or re-aiming of the spray direction 32 of the nozzle 24 onto a hazard area 50. The light ring 124 and the light central dot 126 may also assist in maximizing the protection of the spray area 28 on the hazard area 50 by creating a visual representation of the spray area 28 for the user.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the aiming assembly as shown in the various exemplary embodiments is illustrative only. Additionally, any element disclosed in one embodiment may be incorporated or utilized with any other embodiment disclosed herein. For example, the light source 110 of the exemplary embodiment described in at least paragraph(s) [0033-0039] may be incorporated in the nozzle 24 of the exemplary embodiment described in at least paragraph(s) [0028-0034]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An aiming assembly, comprising:
- a housing configured to be coupled to a nozzle and comprising at least one mounting feature configured to retain the housing in a desired position relative to the nozzle; and
- a light source coupled to the housing and configured to:
  - generate a conical light beam; and
  - generate a second light beam forming a dot within the conical light beam.

2. The aiming assembly of claim 1, wherein the second light beam is projected in a geometrical center of the conical light beam.

3. The aiming assembly of claim 1, wherein the at least one mounting feature comprises an aperture defined by the housing and configured to receive at least a portion of the nozzle.

4. The aiming assembly of claim 1, wherein the conical light beam is adjustable to coincide with a conical shape of a spray pattern of the nozzle.

5. The aiming assembly of claim 1, wherein the at least one mounting feature comprises a magnet configured to interface with the nozzle.

6. The aiming assembly of claim 1, wherein the conical light beam and the second light beam are adjustable by a user.

7. A nozzle assembly, comprising:
- a nozzle; and
- an aiming assembly removably coupled to the nozzle and comprising:
  - a housing defining an aperture to accept the nozzle; and
  - a light source coupled to the housing;
- wherein the light source generates a light pattern including a first light beam configured to coincide with at least a portion of an expected spray pattern of the nozzle and a second light beam configured to be centered on the expected spray pattern of the nozzle.

8. The nozzle assembly of claim 7, wherein the light source is provided at least partially within the housing.

9. The nozzle assembly of claim 7, wherein the light source comprises at least one of an LED and a laser.

10. The nozzle assembly of claim 7, wherein the light pattern is adjustable by a user.

11. The nozzle assembly of claim 7, wherein a spray pattern of the nozzle is conical in shape, and the light pattern is adjustable to provide a conical light beam generally coincidental with a conical portion of the spray pattern.

12. The nozzle assembly of claim 7, wherein the aiming assembly includes a magnet positioned within the aperture in the housing to facilitate coupling of the aiming assembly to the nozzle.

13. The nozzle assembly of claim 7, further comprising a threading positioned within the aperture in the housing to facilitate coupling of the aiming assembly to the nozzle.

14. A method for aiming a nozzle, comprising:
- coupling an aiming assembly to the nozzle;
- projecting a light pattern from the aiming assembly, such that the light pattern provides an indication of an expected spray pattern of the nozzle, the light pattern including (a) a first light beam that projects light across an area and (b) a second light beam that projects a dot within the area;
- aligning the aiming assembly to a spray direction of the nozzle; and
- redirecting the nozzle and the aiming assembly to a desired direction.

15. The method of claim 14, wherein the first light beam is conical in shape and the second light beam extends through a center of the first light beam.

16. The method of claim 14, wherein the light pattern is created by using one of an LED and a laser.

17. The method of claim 14, wherein a spray pattern of the nozzle and the light pattern are coincident.

18. An aiming system, comprising:
- a first aiming assembly comprising:
  - a housing configured to be coupled to a nozzle and comprising at least one mounting feature configured to retain the housing in a desired position relative to the nozzle; and
  - a light source coupled to the housing and configured to selectively:
    - generate a first fixed conical light beam at a first angle; and
    - generate a light image; and
- a second aiming assembly having a second fixed conical light beam at a second angle,
- wherein the first aiming assembly and the second aiming assembly are interchangeable on the nozzle.

19. A nozzle assembly, comprising:
- a nozzle; and a first aiming assembly removably coupled to the nozzle and comprising:

a housing defining an aperture to accept the nozzle; and a light source coupled to the housing, wherein the light source generates a first light pattern defined at a first fixed angle and configured to align with at least a portion of an expected spray pattern of the nozzle; and a second aiming assembly having a second light pattern defined at a second fixed angle, wherein the first aiming assembly and the second aiming assembly are interchangeable on the nozzle.

* * * * *